March 27, 1951      B. G. LOFGREN      2,546,161
FOOT MEASURING DEVICE
Filed Feb. 21, 1947
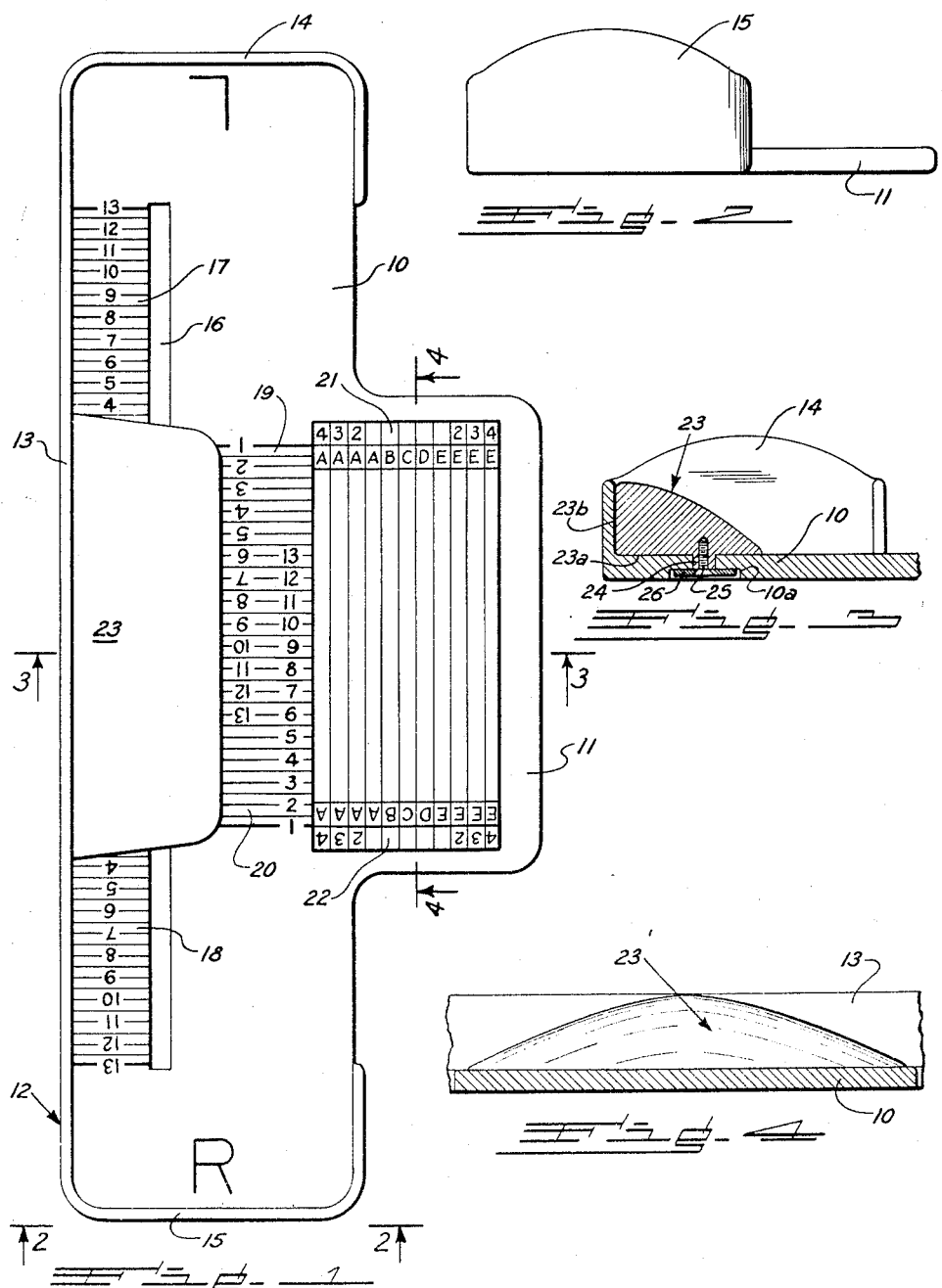
INVENTOR.
Bruce G. Lofgren
BY
ATTORNEY Patented Mar. 27, 1951

2,546,161

UNITED STATES PATENT OFFICE 2,546,161

FOOT MEASURING DEVICE

Bruce G. Lofgren, Denver, Colo.

Application February 21, 1947, Serial No. 730,131

2 Claims. (Cl. 33—3)

The present invention relates to a foot measuring device. It has to do, particularly although not exclusively, with an improved device, instrument, or chart of this character which is capable of accurately measuring the length and width or breadth of a human foot to permit the proper and accurate fitting of shoes to the foot. This invention is an improvement upon the measuring instruments or devices of the United States patents to Charles F. Brannock Nos. 1,682,366; 1,725,334; and 2,078,368.

Many devices for measuring the human feet have appeared upon the market but in all cases so far as is known, it has been the common practice to provide a scaled-base member upon which the foot was placed under the weight of the body, and measurements taken of said foot under such weight. The natural tendency has been for the person, perhaps unconsciously but at any rate actually, to apply more than the usual or natural weight to the foot being measured, resulting in an inaccurate reading of the measurement, in many instances. This was due primarily to the fact that there was no means, other than the plane or flat top surface of the scaled member, provided for supporting the foot naturally, as in a shoe having an arch supporting portion.

It is, therefore, one of the objects of the present invention to provide a device, instrument, or chart for accurately measuring the length and width of the human foot or feet to permit the proper fitting of a shoe to said foot; it being a further and important object of the invention to provide means for supporting the arch of the human foot during the measuring operation.

Another object of the present invention is to provide an improved foot measuring device or instrument of the foregoing character in which adjustable means for supporting the arch of a human foot during the measuring of its length and width, is provided.

A further object of the present invention is to provide a foot measuring device or instrument having a flat base portion with heel abutments at its opposite ends and a side abutment between the heel abutments, dual or duplicated length-indicating scales and dual or duplicated width-indicating scales located on the base, and lengthwise adjustable arch supporting means movably and removably connected with the base for supporting the arch portion of a human foot for measurement purposes.

Another object of the present invention is to provide an improved foot measuring device or instrument of the foregoing nature which is of relatively simple construction, having a minimum of parts, and one which may be formed from various kinds of material such as plastic, wood, metal, or the like, and which may be produced by mass production methods and at relatively low manufacturing cost.

The foregoing objects and advantages of the present invention will appear from the following description and appended claims when considered in connection with the accompanying drawings forming a part of this specification, wherein like reference characters designate corresponding parts in the several views.

In said drawings:

Fig. 1 is a top plan view of a foot measuring device, instrument, or chart embodying the present invention.

Fig. 2 is an end elevational view of said device taken substantially along the line 2—2 of Fig. 1, looking in the direction of the arrows.

Fig. 3 is a transverse vertical section taken substantially along the line 3—3 of Fig. 1, looking in the direction of the arrows; and Fig. 4 is a longitudinal fragmentary vertical sectional view taken substantially along the line 4—4 of Fig. 1, looking in the direction of the arrows.

Before explaining in detail the present invention it is to be understood that the invention is not limited in its application to the details of construction and arrangement of parts illustrated in the accompanying drawing, since the invention is capable of other embodiments and of being practiced or carried out in various ways. It is to be understood also that the phraseology or terminology employed herein is for the purpose of description and not of limitation, and it is not intended to limit the invention claimed herein beyond the requirements of the prior art.

Referring now particularly to the drawings, the foot measuring device or instrument of the present invention comprises, as shown, a base member 10 having a side extension or offset portion 11, Figs. 1 and 2. The base, as shown, is provided with an upright flange, shown as a whole at 12, which extends along one side of the base 10 to provide a side abutment or gauge 13 and around opposite ends of the base to provide a heel abutment or gauge 14 for the left foot and another and similar heel abutment or gauge 15 for the right foot. As shown, the base 10, extension 11 and the flange 12 comprising the abutment or gauge portions 13, 14, and 15, are formed integrally, or in one piece, preferably from plastic, wood, metal, or the like. Other materials may be employed, however, for producing the base and flange. Moreover, the base 10 and the flange 12 may be, if desired, formed separately and secured together in any desirable manner and by any suitable means.

The base 10, see Figs. 1 and 3, is provided with a longitudinal slot or opening 16 which is preferably disposed parallel to the side abutment 13 and spaced inwardly therefrom, as shown.

A dual or duplicated foot length-indicating scale having reversed graduated sections 17 and 18 is arranged on the top surface of the base between the side abutment 13 and the longitudinal slot 16. Portions of this dual length-measuring scale are offset or disposed at the opposite side of the slot 16, as indicated at 19 and 20 in Fig. 1. A dual or duplicated foot width-measuring scale, having reversed portions 21 and 22, is impressed upon or otherwise applied to the top surface of the lateral projecting portion or extension 11 of the base member 10 adjacent the offset portions 19 and 20 of the foot length-measuring scale. These dual or duplicated graduated scales permit the measurement of either the right foot or the left foot, the heel of the left foot being, of course, positioned against the abutment 14 and the heel of the right foot against the abutment 15 during the measuring operations.

It is important that as accurate measurements of the foot be taken as is possible so as to get the correct and necessary or desirable fitting in a shoe. This has not been possible with foot measuring devices or instruments heretofore known and used.

In accordance with the present invention, the foot measuring device or instrument is provided with an arch-engaging and supporting member, shown as a whole at 23, see Figs. 1, 3 and 4. This member is preferably in the form of a block formed from plastic, wood, or other suitable material and having a flat base or bottom 23a and an upright plane side edge 23b, see Fig. 3, the portions or surfaces 23a and 23b lying preferably flatwise against the top surface of the base portion 10 and the inner wall or surface of the side abutment or gauge 13, respectively. The base or bottom 23a of the arch-supporting block or member 23 is provided with a longitudinal rib or member 24 which fits in and cooperates with the longitudinal slot, groove or opening 16, see particularly Fig. 3. The member or projection 24 may, if desired, be merely a downward projection or stud and need not be elongated to extend longitudinally of the arch-supporting block 23.

The block 23 is held in adjustable or movable engagement relative to the base 10 by means of a screw 25 and a bearing plate or washer 26, see Fig. 3. This washer or member 26 is preferably positioned in a recessed or countersunk portion 10a of the base, as clearly seen in Fig. 3. Thus, the block 23, by virtue of its construction and its means of connection with the base 10, is allowed longitudinal movement or adjustment in either or both directions toward and from the abutments 14 and 15 in a controlled and predetermined path, so that the block may be moved into the proper position to properly engage and support the arch of the foot while being measured.

By virtue of the provision of the adjustable arch-supporting member or block 23, the accurate length and width measurements of the foot may be taken, notwithstanding the fact that the person whose foot is being measured unconsciously applies more than the usual proportion or amount of his weight to the foot during the measuring operation.

The member 23 while being adjustable, is also removable or detachable, it being merely necessary to remove the screw or bolt 25 to permit separation of the parts. This removability of the arch-supporting member 23 permits other members of this general nature to be installed and replacement to be made, if necessary or desirable.

Having thus described the invention, what is claimed is:

1. A foot measuring device comprising a flat base member for receiving and supporting either the right or the left foot of a human being when in a standing or sitting position, said base being capable of sustaining the weight of said human being and having on its foot-engaging upper surface a foot length-indicating scale and a foot width-indicating scale, said scales having graduations thereon to indicate, respectively, the length and width of the human foot while being subjected to the weight of at least a portion of the human body, heel abutments disposed at opposite ends of the base and extending transversely thereof and a side abutment for the side of the foot disposed above a side edge of said base, said side abutment extending uninterruptedly and longitudinally of and throughout the length of the base and interconnecting the transversely extending heel abutments, and a foot arch-supporting member mounted upon and movable lengthwise of the base adjacent said side abutment, said arch-supporting member having its top surface shaped to conform generally to the shape of the human arch to support said arch under the weight of the user of the device to thereby permit the accurate measurements of the foot to be taken while remaining in a position comparable to the position of the foot while in a shoe.

2. A foot measuring device according to claim 1, wherein the under face of the base has a countersunk portion and said base has a slot extending lengthwise of the countersunk portion and spaced inwardly from the longitudinal side edges of said countersunk portion, wherein the arch-supporting member has a portion cooperating with said slot to permit lengthwise adjustment of the member relative to the base, and wherein means is provided for releasably maintaining the cooperating portion of the arch-supporting member in the slot, said means being disposed at one side of the center of the underface of said arch-supporting member and including a washer and a screw, the washer being disposed entirely within the countersunk portion and being out of contact with the longitudinal side edges of said countersunk portion.

BRUCE G. LOFGREN.

REFERENCES CITED

The following references are of record in the file of this patent:

UNITED STATES PATENTS

| Number | Name | Date |
|---|---|---|
| 1,298,579 | Schnippel | Mar. 25, 1919 |
| 1,391,714 | Blake | Sept. 27, 1921 |
| 1,689,040 | Marron | Oct. 23, 1928 |
| 1,725,334 | Brannock | Aug. 20, 1929 |
| 1,837,809 | Delhaye | Dec. 22, 1931 |
| 1,873,663 | Pietzuch | Aug. 23, 1932 |
| 2,096,500 | McCahan | Oct. 19, 1937 |
| 2,148,650 | Scholl | Feb. 28, 1939 |

FOREIGN PATENTS

| Number | Country | Date |
|---|---|---|
| 118,852 | Australia | Aug. 22, 1944 |
| 291,966 | Great Britain | June 14, 1928 |